US00RE47529E

(19) United States
(12) Reissued Patent
Johnson et al.

(10) Patent Number: US RE47,529 E
(45) Date of Reissued Patent: Jul. 23, 2019

(54) FE-BASE IN-SITU COMPOSITE ALLOYS COMPRISING AMORPHOUS PHASE

(75) Inventors: William L. Johnson, San Marino, CA (US); Choongnyun Paul Kim, Northridge, CA (US)

(73) Assignee: Apple Inc., Cupertino, CA (US)

(21) Appl. No.: 13/298,929

(22) Filed: Jun. 13, 2012

Related U.S. Patent Documents

Reissue of:
(64) Patent No.: 7,618,499
Issued: Nov. 17, 2009
Appl. No.: 10/573,148
PCT Filed: Oct. 1, 2004
PCT No.: PCT/US2004/032093
§ 371 (c)(1),
(2), (4) Date: Dec. 21, 2006
PCT Pub. No.: WO2005/033350
PCT Pub. Date: Apr. 14, 2005

(51) Int. Cl.
*C22C 45/02* (2006.01)
*C22C 38/00* (2006.01)

(52) U.S. Cl.
CPC ..... *C22C 45/02* (2013.01); *C22C 38/00* (2013.01)

(58) Field of Classification Search
CPC ..... C22C 45/02; C22C 38/00
See application file for complete search history.

(56) References Cited

U.S. PATENT DOCUMENTS

| | | | | |
|---|---|---|---|---|
| 2,106,145 | A | 1/1938 | Floraday | |
| 2,124,538 | A | 7/1938 | Boyer | |
| 3,322,546 | A | 5/1967 | Tanzman et al. | |
| 3,539,192 | A | 11/1970 | Prasse | |
| 3,776,297 | A | 12/1973 | Williford et al. | |
| 3,948,613 | A | 4/1976 | Weill | |
| 3,970,445 | A | 7/1976 | Gale et al. | |
| 3,986,867 | A | 10/1976 | Masumoto et al. | |
| 3,986,892 | A | 10/1976 | Ewe et al. | |
| 4,024,902 | A | 5/1977 | Baum | |
| 4,067,732 | A | 1/1978 | Ray | |
| 4,124,472 | A | 11/1978 | Riegert | |
| 4,125,737 | A | 11/1978 | Andersson | |
| 4,163,071 | A | 7/1979 | Weatherly et al. | |
| 4,260,416 | A | 4/1981 | Kavesh et al. | |
| 4,268,564 | A | 5/1981 | Narasimhan | |
| 4,330,027 | A | 5/1982 | Narasimhan | |
| 4,374,900 | A | 2/1983 | Hara et al. | |
| 4,381,943 | A | 5/1983 | Dickson et al. | |
| 4,396,820 | A | 8/1983 | Puschner | |
| 4,409,296 | A | 10/1983 | Ward | |
| 4,482,612 | A | 11/1984 | Kuroki et al. | |
| 4,487,630 | A | 12/1984 | Crook et al. | |
| 4,488,882 | A | 12/1984 | Dausinger et al. | |
| 4,499,158 | A | 2/1985 | Onuma et al. | |
| 4,515,870 | A | 5/1985 | Bose et al. | |
| 4,523,625 | A | 6/1985 | Ast | |
| 4,526,618 | A | 7/1985 | Keshavan et al. | |
| 4,557,981 | A | 12/1985 | Bergmann | |
| 4,564,396 | A | 1/1986 | Johnson et al. | |
| 4,585,617 | A | 4/1986 | Tenhover et al. | |
| 4,612,059 | A | 9/1986 | Mori et al. | |
| 4,656,099 | A | 4/1987 | Sievers | |
| 4,668,310 | A | 5/1987 | Kudo et al. | |
| 4,704,169 | A | 11/1987 | Kimura et al. | |
| 4,725,512 | A | 2/1988 | Scruggs | |
| 4,731,253 | A | 3/1988 | DuBois | |
| 4,741,974 | A | 5/1988 | Longo et al. | |
| 4,770,701 | A | 9/1988 | Henderson et al. | |
| 4,810,850 | A | 3/1989 | Tenkula et al. | |
| 4,960,643 | A | 10/1990 | Lemelson | |
| 5,112,388 | A * | 5/1992 | Schulz et al. | 419/8 |
| 5,127,969 | A | 7/1992 | Sekhar | |
| 5,189,252 | A | 2/1993 | Huffman et al. | |
| 5,288,344 | A | 2/1994 | Peker et al. | |
| 5,294,462 | A | 3/1994 | Kaiser et al. | |
| 5,340,413 | A | 8/1994 | Martis | |
| 5,368,659 | A | 11/1994 | Peker et al. | |
| 5,380,349 | A | 1/1995 | Taniguchi et al. | |
| 5,440,995 | A | 8/1995 | Levitt | |
| 5,482,577 | A | 1/1996 | Hashimoto et al. | |
| 5,567,251 | A | 10/1996 | Peker et al. | |
| 5,567,532 | A | 10/1996 | Peker et al. | |
| 5,735,975 | A | 4/1998 | Lin et al. | |
| 5,866,254 | A | 2/1999 | Peker et al. | |
| 6,010,580 | A | 1/2000 | Dandliker et al. | |
| 6,183,889 | B1 | 2/2001 | Koshiba et al. | |
| 6,218,029 | B1 | 4/2001 | Rickerby | |
| 6,261,386 | B1 * | 7/2001 | Perepezko et al. | 148/302 |
| 6,325,868 | B1 | 12/2001 | Kim et al. | |
| 6,326,295 | B1 | 12/2001 | Figura | |
| 6,669,793 | B2 * | 12/2003 | Hays | 148/561 |
| 6,692,590 | B2 | 2/2004 | Xing et al. | |
| 6,709,536 | B1 | 3/2004 | Kim et al. | |
| 7,141,127 | B2 * | 11/2006 | Yoshizawa | 148/307 |
| 7,357,731 | B2 * | 4/2008 | Johnson et al. | 473/349 |
| 7,517,415 | B2 * | 4/2009 | Poon et al. | 148/403 |
| 7,618,499 | B2 * | 11/2009 | Johnson et al. | 148/403 |
| 7,862,957 | B2 | 1/2011 | Wende | |
| 2002/0036034 | A1 | 3/2002 | Xing et al. | |
| 2007/0003812 | A1 * | 1/2007 | Wende | 429/38 |

FOREIGN PATENT DOCUMENTS

| | | | |
|---|---|---|---|
| DE | 010237992 | A1 | 3/2003 |
| GB | 2005302 | A | 4/1979 |
| JP | 56112449 | | 9/1981 |
| JP | 02001303218 | A | 10/2001 |
| WO | WO 00/68469 | A2 | 11/2000 |
| WO | WO 03/040422 | A1 | 5/2003 |

OTHER PUBLICATIONS

Koch et al., "Preparation of "Amorphous" Ni60Nb40 By Mechanical Alloying", Appl. Phys. Lett., Dec. 1983, vol. 43, No. 11, pp. 1017-1019.

Author unknown, "Standard Practice for Conducting Dry Sand/Rubber Wheel Abrasion Tests", Designation G 65-81, source unknown, pp. 351-368.

(Continued)

*Primary Examiner* — Sean E Vincent
(74) *Attorney, Agent, or Firm* — Brownstein Hyatt Farber Schreck, LLP

(57) ABSTRACT

An Fe-base in-situ composite alloy, castable into 3-dimensional bulk objects *is provided*, where the alloy includes a matrix having one or both of a nano-crystalline phase and an amorphous phase, and a face-centered cubic crystalline phase. The alloy has an Fe content *of* more than 60 atomic percent.

22 Claims, No Drawings

(56) References Cited

OTHER PUBLICATIONS

Author unknown, "A World of Superabrasives Experience At Your Service", source unknown, 4 pgs.
Author unknown, "GE Superabrasives—The Metal Bond System", source unknown, 1 pg.
Author unknown, "GE Superabrasives—The Resin Bond System", source unknown, 1 pg.
Author unknown, "GE Superabrasives—Micron Powders", source unknown, 1 pg.
Author unknown, "GE Superabrasives—The MBS 700 Series Product Line", source unknown, 2 pgs.
Author unknown, "GE Superabrasives—The MBS-900 Series Product Line", source unknown, 2 pgs.
Masumoto, "Recent Progress in Amorphous Metallic Materials in Japan", Materials Science and Engineering, 1994, vol. A179/A180, pp. 8-16.
ASM Committee on Tooling Materials, "Superhard Tool Materials", Metals Handbook, Ninth Edition, vol. 3, Properties and Selection: Stainless Steels, Tool Materials and Special Purpose Metals, American Society for Metals, 1980, pp. 448-465, title page and copyright page.

* cited by examiner

FE-BASE IN-SITU COMPOSITE ALLOYS COMPRISING AMORPHOUS PHASE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The present invention is directed to Fe-base alloys that form in-situ composites comprising amorphous phase during solidification at low cooling rates, and more particularly to such alloys having high strength, high hardness and high toughness.

BACKGROUND OF THE INVENTION

Since the wide-spread use of Fe began with the industrial revolution, numerous Fe-base alloys have been developed. Most of these Fe-base alloys are based on an Fe—C system, however, numerous associated micro-structures have been developed by design or serendipitously in order to improve the strength and toughness or to strike a desirable compromise between the strength and toughness of these alloys. These micro-structure developments can be grouped into two categories: 1) refinement of crystalline grain size; and 2) synthesis of two or more crystalline phases.

With the large interest in this field there have been major advances in such micro-structural development efforts, including improving the mechanical properties of Fe-base alloys. However, it appears that the steady improvement in crystalline Fe-base alloys has reached a plateau in terms of the mechanical strength and toughness of such alloys. For example, the state of the art Fe-base steels, and even those steels with more complex chemical compositions, has a strength limit of around 2.0 GPa. Furthermore, such strength Fe-base alloys can generally only be obtained through highly complex heat treatments that put significant limitations on the fabrication of three-dimensional bulk objects from these alloys. In addition, conventional Fe-base alloys, without the addition of certain elements, are highly susceptible to corrosion and rust, limiting their useful lifetime and potential applications as well.

Alternative atomic microstructures, in the form of highly metastable phases, have also been developed for Fe-base alloys in order to achieve higher alloy strengths. One such material are those alloys having an amorphous phase, which is unique in the sense that there is no long-range atomic order, and as such there is no typical microstructure with crystallites and grain boundaries. These alloys have generally been prepared by rapid quenching of the molten alloy from above the melt temperature down to the ambient temperature. Generally, cooling rates of $10^{5\circ}$ C./sec or higher have been employed to achieve an amorphous structure, e.g., Fe-base amorphous alloys based on Fe—Si—B system. However, due to the high cooling rates required, heat cannot be extracted from thick sections of such alloys, and as such, the thickness of these amorphous alloys has been limited to tens of micrometers in at least in one dimension. This thickness in the limiting dimension is referred to as a critical casting thickness and can be related to the critical cooling rate required to form the amorphous phase by heat-flow calculations. This critical thickness (or critical cooling rate) can be used as a measure of the processability of these amorphous alloys into practical shapes. Even though there have been significant improvements in recent years in developing Fe-base amorphous alloys with high processibility, i.e., lower critical cooling rate, the largest cross-sectional thickness available for these alloys is still on the order of a few millimeters. Furthermore, although Fe-base amorphous alloys exhibit very high flow-stress levels (on the order of 3.0 GPa or more, well above the crystalline Fe-base alloys), these amorphous alloys are intrinsically limited in toughness and tensile ductility, and as such have limitations in certain broad application fields.

Accordingly, a need exists for Fe-base alloys having high flow stress, exceeding 2.0 GPa, and high toughness that are also processable into three dimensional bulk objects.

SUMMARY OF THE INVENTION

The present invention is directed to in-situ composites of Fe-base alloys according to the current invention comprising an amorphous phase and fcc (face-centered cubic) gama phase.

In one embodiment, the alloys of the current invention are based on the ternary Fe—Mn—C ternary system.

In another embodiment, the basic components of the Fe-base alloy system may further contain other transition group-group elements such as Co, Ni and Cu in order to ease the casting of the alloy into large bulk objects or increase the processability of the in-situ composite microstructure. In one such embodiment, the combined group of Fe, Mn, Co, Ni and Cu is generally in the range of from 80 to 86 atomic percentage of the total alloy composition, and C is in the range of from 8 to 16 atomic percentage of the total alloy composition.

In another embodiment the Fe-base in-situ composite alloy is castable into 3-dimensional bulk objects, wherein the alloy comprises a matrix having one or both of a nano-crystalline phase and an amorphous phase, and a face-centered cubic crystalline phase. The Fe content is more than 60 atomic percent. In one embodiment the matrix is substantially amorphous phase. In another embodiment the matrix is substantially nano-crystalline phase. The volume percentage of the amorphous phase can be in the range of from 5% up to 70%. The volume percentage of the matrix is in the range of from 20% up to 60%. Further, the face-centered cubic crystalline phase is in the form of dendrites.

In one exemplary embodiment, the alloy is substantially formed by Fe, (Mn, Co, Ni, Cu) (C, Si, B, P, Al), wherein the Fe content is from 60 to 75 atomic percentage, the total of (Mn, Co, Ni, Cu) is in the range of from 5 to 25 atomic percentage, and the total of (C, Si, B, P, Al) is in the range of from 8 to 20 atomic percentage. In such an embodiment, the content of (C, Si, B, P, Al) can be higher in the matrix than in the face-centered cubic crystalline phase.

In another exemplary embodiment, the alloy is substantially formed by Fe (Mn, Co, Ni, Cu) (C, Si), wherein the Fe content is from 60 to 75 atomic percentage, the total of (Mn, Co, Ni, Cu) is in the range of from 5 to 25 atomic percentage, and the total of (C, Si) is in the range of from 8 to 20 atomic percentage, and the Si to C ratio is less than 0.5. The alloy is substantially formed by Fe (Mn, Co, Ni, Cu) (C), wherein the Fe content is from 60 to 75 atomic percentage, the total of (Mn, Co, Ni, Cu) is in the range of from 5 to 25 atomic percentage, and the content of C, is in the range of from 8 to 20 atomic percentage. The content of C is higher in the matrix than in the face-centered cubic crystalline phase.

In exemplary embodiments, the alloy can further comprise a Cr content up to 8 atomic percent. Alternatively, the alloy can further comprise a total of (Cr, Mo) content up to 8 atomic percent. The exemplary alloy can further comprise a Y content up to 3 atomic percent.

In another exemplary embodiment, an Fe-base in-situ composite alloy includes a matrix comprising one or both of a nano-crystalline phase and an amorphous phase, and a face-centered cubic crystalline phase. The alloy comprises an Fe moiety in the range of 5% to 70%, and a three dimensional shape having a measurement of at least 0.5 mm in each dimension. The alloy also has a flow-stress level of at least 2.0 GPa.

DETAILED DESCRIPTION OF THE INVENTION

The present invention is directed to a family of Fe-base alloys that form in-situ composites comprising an amorphous phase during solidification at low cooling rates. The alloys according to the present invention have a combination of high strength of ~2.0 GPa or higher, high hardness of ~600 Vickers or higher, and high toughness and ductility. Furthermore, these alloys have lower melting temperatures than typical steels making them easier to cast into various shaped objects.

The in-situ composites of the Fe-base alloys according to the current invention are based on the ternary Fe—Mn—C ternary system, and the extension of this ternary system to higher order alloys by adding one or more alloying elements. These alloys can be castable into three-dimensional bulk objects while forming in-situ composite microstructures comprising an amorphous phase with desirable mechanical properties at typical cooling rates of 0.1 to 1,000° C./second. Preferably, the cooling rates are in the order of 1 to 100° C./second. It should be noted that these cooling rates are much lower than typical critical cooling rates of corresponding "fully" amorphous Fe-base alloys. Herein, the term three-dimensional refers to an object having a measurement of at least 0.5 mm in each dimension, and preferably 5.0 mm or more in each dimension.

Although the basic components of the Fe-base alloy system are Fe, Mn and C, Mn portion may be associated with other transition metal elements such as Co, Ni and Cu in order to ease the casting of the alloy into large bulk objects or increase the processability of the in-situ composite microstructure. The combined group of Mn, Co, Ni and Cu is called the Mn-moiety and it is generally in the range of from 5 to 25 atomic percentage of the total alloy composition. Meanwhile, C is in the range of from 8 to 16 atomic percentage of the total alloy composition and the Fe content is from 60 to 75 atomic percentage. Furthermore, the C portion may be associated with other metalloid elements such as B, Si, P, and Al. The combined group of C, Si, B, P and Al is called the C-moiety and it is generally in the range of from 8 to 20 atomic percentage of the total alloy composition.

The in-situ composite of the present invention has substantially only two phases: a "face-centered cubic" (fcc) crystalline solid solution phase, and an amorphous phase. The fcc solid solution is richer in Fe content and has lower C content than the amorphous phase, which is richer in C content and has lower Fe content. The fcc solid solution forms primarily by dendritic solidification, and among the dendrites of the fcc solid solution is the amorphous phase. The volume percentage of the amorphous phase can be in the range of from 5% up to 70% or more and preferably in the range of from 20% up to 60%. The particle size of the fcc crystalline phase is in the range of 1 to 100 microns and preferably 3 to 30 microns. In one preferred embodiment, the amorphous phase is a continuous phase and percolates through the entire composite structure as a matrix. In another preferred embodiment, the percolating amorphous phase isolates the dendritically formed fcc crystallites and acts as a matrix encompassing the dendritically formed fcc crystallites. The formation of other phases in the in-situ composite is not desired and particularly the formation of intermetallic compounds should be avoided in order to keep the volume percentage of these compounds to less than 5%, and preferably less than 1% of the total alloy composition.

In another embodiment of the invention, the matrix can also be in the form of nano-crystalline phase or a combination of amorphous and nano-crystalline phase. Herein, the nanometer phase is defined as where the grain size is less than about 10 nanometers in average size.

Although a higher Fe content is desired for reduced cost, additional alloying elements at the expense of Fe are desired for increasing the content of the amorphous phase, to improve the stability of fcc solid solution against other crystalline phases, and for reducing the melting temperature and increasing the processibility of the in-situ composite microstructure. Ni and Co is especially preferred to stabilize the fcc solid solution crystalline phase against the formation of other competing crystalline phases, such as intermetallic compounds. The total Ni and Co content can be in the range of from 5% to 20% atomic, and preferably 10% to 15% in the overall composition.

Cr is a preferred alloying element for improving the corrosion resistance of the alloy material. Although a higher content of Cr is preferable for higher corrosion resistance, the Cr content is desirably less than 8% in order to preserve a high procesability and the formation of toughness-improving fcc gama phase.

Mo is a preferred alloying element for improving the strength of the alloy material. Mo should be treated as similar to Cr and when added it should be done so at the expense of Cr. The Mo content may be up to 8% of the total alloy composition Si is a preferred alloying element for improving the processability of the in-situ composite microstructure. The addition of Si is especially preferred for increasing the concentration of the amorphous phase, and lowering the melting temperature of the alloy. The Si addition should be done at the expense of C, where the Si to C ratio is less than 0.5.

B is another preferred alloying element for increasing the concentration of the amorphous phase in the alloy. B should be treated as similar to Si, and when added it should be done at the expense of Si and/or C. For increased processability of the in-situ composite microstructure, the content of B should be less than 6 atomic percentage, and preferably less than 3 atomic percentage. The higher B content may also be preferred in order to increase the strength and the hardness values of the alloy.

It should be understood that the addition of the above mentioned alloying elements may have varying degrees of effectiveness for improving the formation of the in-situ composite microstructure in the spectrum of the alloy composition ranges described above, and this should not be taken as a limitation of the current invention.

Other alloying elements can also be added, generally without any significant effect on the formation of the in-situ composite microstructure when their total concentration in the alloy is limited to less than 2% of the composition. However, higher concentrations of other elements can degrade the processability of the alloy, and the formation of in-situ composite microstructures, especially when compared to the exemplary alloy compositions described below. In limited and specific cases, the addition of other alloying elements may improve the processability and the formation of in-situ composite microstructure of alloy compositions with marginal ability to form in-situ composites. For example, minute amounts of elements with high affinity to oxygen, such as Y, can be added up to 3% in order to improve the processability and to aid the formation of amorphous phase by scavenging gaseous impurities such as oxygen. It should be understood that such cases of alloy compositions would also be included in the current invention.

When the Fe moiety is less than the above-described values, then the formation of intermetallic compounds can be facilitated, which will in turn degrade the mechanical properties of the alloy. When the Fe-moiety is more than the above above-described values, then the formation of in-situ composite comprising the amorphous phase will be avoided. Rather, a single-phase fcc solid solution (or a bcc solid solution crystalline phase) will form. The amorphous phase is needed in order to impart strength into the in-situ composite by constraining the deformation of the fcc solid solution crystalline phase. In one preferred embodiment of the invention, the amorphous phase substantially encapsulates the dendritic crystallites of fcc solid solution crystalline phase. The higher the concentration of the amorphous phase, the higher the strength and hardness values of the alloy. Likewise, the dendritic fcc solid solution phase is desired in order to provide toughness to the in-situ composite alloy.

While several forms of the present invention have been illustrated and described, it will be apparent to those of ordinary skill in the art that various modifications and improvements can be made without departing from the spirit and scope of the invention. Accordingly, it is not intended that the invention be limited, except as by the appended claims.

What is claimed is:

1. An Fe-base in-situ composite alloy, castable into 3-dimensional bulk objects, wherein the alloy when cast comprises:

a matrix comprising one or both of a nano-crystalline phase and an amorphous phase;

a face-centered cubic crystalline phase; and an Fe content more than 60 atomic percent;

*an Mn content in the range of from about 5 to about 25 atomic percent;* wherein the face-centered cubic crystalline phase is in the form of dendrites, *and*

*wherein the alloy contains at least one of C, Si, B, P, and Al in the range from about 8 to about 20 atomic percent and the total content of the at least one C, Si, B, P, or Al is higher in the matrix than in the face-centered cubic crystalline phase.*

2. The alloy as in claim 1, wherein the matrix is substantially amorphous phase.

3. The alloy as in claim 1, wherein the matrix is substantially nano-crystalline phase.

4. The alloy as in claim 1, wherein the volume percentage of the amorphous phase is in the range of from 5% up to 70%.

5. The alloy as in claim 1, wherein the volume percentage of the matrix is in the range of from 20% up to 60%.

6. The alloy as in claim 1, wherein the alloy is substantially formed by Fe, (Mn, Co, Ni, Cu) (C, Si, B, P, Al), wherein the Fe content is from *more than* 60 to 75 atomic percentage, the total of (Mn, [Ca] *Co*, Ni, Cu) is in the range of from 5 to 25 atomic percentage, and the total of (C, Si, B, P, Al) is in the range of from 8 to 20 atomic percentage.

[7. The alloy as in claim 6, wherein the content of (C, Si, B, P, Al) is higher in the matrix than in the face-centered cubic crystalline phase.]

8. The alloy as in claim 6, wherein the alloy is substantially formed by Fe (Mn, Co, Ni, Cu) (C, Si), wherein the Fe content is from *more than* 60 to 75 atomic percentage, the total of (Mn, Co, Ni, Cu) is in the range of from 5 to 25 atomic percentage, and the total of (C, Si) is in the range of from 8 to 20 atomic percentage, and the Si to C ratio is less than 0.5.

9. The alloy as in claim 6, wherein the alloy is substantially formed by Fe (Mn, Co, Ni, Cu) (C), wherein the Fe content is from *more than* 60 to 75 atomic percentage, the total of (Mn, Co, Ni, Cu) is in the range of from 5 to 25 atomic percentage, and the content of C, is in the range of from 8 to 20 atomic percentage.

10. [The alloy as in claim 9.] *An Fe-base in-situ composite alloy, castable into 3-dimensional bulk objects, wherein the alloy when cast comprises:*

*a matrix comprising one or both of a nano-crystalline phase and an amorphous phase;*

*a face-centered cubic crystalline phase; and*

*an Fe content more than 60 atomic percent;*

*an Mn content wherein the range of Fe and Mn is from about 80 to about 86 atomic percent of the total alloy composition;*

*wherein the face-centered cubic crystalline phase is in the form of dendrites, wherein the alloy contains* (*C*) *and* wherein the content of C is higher in the matrix than in the face-centered cubic crystalline phase.

11. The alloy as in claim 6, further comprising a total of (Cr, Mo) content up to 8 atomic percent.

12. The alloy as in claim 6, further comprising a Y content up to 3 atomic percent.

13. The alloy as in claim 1, further comprising a Cr content up to 8 atomic percent.

14. The alloy as in claim 1, further comprising a Y content up to 3 atomic percent.

15. The in-situ composite alloy as in claim 1, wherein the particle size of the face-centered cubic crystalline phase is in the range of 3 to 30 microns.

16. An article formed of an Fe-base in-situ composite alloy comprising:

a matrix comprising one or both of a nano-crystalline phase and an amorphous phase;

a face-centered cubic crystalline phase;

an Fe content in the range of 65% to 70%;

*at least one of Mn, Co, Ni, and Cu in the range of from about 5 to about 25 atomic percent;* a three dimensional shape having a measurement of at least 0.5 mm in each dimension; and a flow-stress level of at least about 2.0 GPa;

wherein the face-centered cubic crystalline phase is in the form of dendrites, *and*

*wherein the alloy contains C, and the total content of C is higher in the matrix than in the face-centered cubic crystalline phase.*

17. The article formed from the in-situ composite alloy as in claim 16, wherein the particle size of the face-centered cubic crystalline phase is in the range of 1 to 100 microns.

*18. A bulk solidifying amorphous alloy comprising a Fe-base in-situ composite alloy comprising a matrix and a face-centered cubic crystalline phase; wherein the matrix comprises one or both of a nano-crystalline phase and an amorphous phase, and wherein the face-centered cubic crystalline phase comprises dendrites, wherein the alloy contains Mn and (C) and the content of C is higher in the matrix than in the face-centered cubic crystalline phase.*

*19. An object comprising the bulk solidifying amorphous alloy of claim 18, the article comprises at least one dimension having a size of at least 0.5 mm.*

*20. A 3-dimensional bulk object comprising an Fe-base in-situ composite alloy comprising a matrix and a face-centered cubic crystalline phase; wherein the matrix comprises one or both of a nano-crystalline phase and an amorphous phase, and wherein the face-centered cubic crystalline phase comprises dendrites, wherein the alloy contains (Mn, Co, Ni, Cu) (C, Si, B, P, Al) and the content of (C, Si, B, P, Al) is higher in the matrix than in the face-centered cubic crystalline phase.*

*21. An object comprising the bulk solidifying amorphous alloy of claim 20, the 3-dimensional bulk object comprises at least one dimension having a size of at least 0.5 mm.*

*22. An article formed of an Fe-base in-situ composite alloy comprising:*

*a matrix comprising one or both of a nano-crystalline phase and an amorphous phase;*

*a face-centered cubic crystalline phase;*

*an Fe content in the range of 65% to 70%;*

*at least one of Mn, Co, Ni, and Cu in the range of from about 5 to about 25 atomic percent;*

*a three dimensional shape having a measurement of at least 0.5 mm in each dimension; and*

*a flow-stress level of at least about 2.0 GPa;*

*wherein the face-centered cubic crystalline phase is in the form of dendrites, wherein the alloy contains (C, Si, B, P, Al) and the content of (C, Si, B, P, Al) is higher in the matrix than in the face-centered cubic crystalline phase.*

*23. An Fe-base in-situ composite comprising:*

*a matrix comprising one or both of a nano-crystalline phase and an amorphous phase;*

*a face-centered cubic crystalline phase; and*

*an Fe content more than 65% to 70% atomic percent;*

*at least one of Mn, Co, Ni, and Cu in the range of from 5 to 25 atomic percent;*

*wherein the face-centered cubic crystalline phase is in the form of dendrites, and*

*wherein the alloy contains at least one of C, Si, B, P, and Al in the range of from 8 to 20 atomic percent and the total content of the at least one C, Si, B, P, or Al is higher in the matrix than in the face-centered cubic crystalline phase.*

* * * * *